United States Patent [19]
Reinfelder et al.

[11] Patent Number: 5,475,622
[45] Date of Patent: Dec. 12, 1995

[54] METHOD AND APPARATUS FOR BALANCING HELICOPTER ROTOR BLADES

[75] Inventors: William C. Reinfelder, Woodbridge; Kevin P. Leahy, Naugatuck; Corey D. Jones, Prospect; David A. Kovalsky, Shelton, all of Conn.

[73] Assignee: United Technologies Corp., Hartford, Conn.

[21] Appl. No.: 298,712

[22] Filed: Aug. 31, 1994

[51] Int. Cl.⁶ .................................................. G01M 1/12
[52] U.S. Cl. ........................... 364/571.01; 73/455; 73/456
[58] Field of Search ............................ 364/571.01, 508; 73/66, 455, 456, 458; 82/903; 416/144, 145

[56] References Cited

U.S. PATENT DOCUMENTS

| | | | |
|---|---|---|---|
| Re. 26,047 | 6/1966 | Freeman | 73/455 |
| Re. 34,207 | 3/1993 | Nelson et al. | 416/226 |
| 2,388,705 | 11/1945 | Reiber | 73/66 |
| 3,782,202 | 1/1974 | Anderson et al. | 73/455 |
| 3,952,601 | 4/1976 | Galli et al. | 73/455 |
| 3,999,888 | 12/1976 | Zincone | 416/145 |
| 4,078,422 | 3/1978 | Brunsch et al. | 73/65 |
| 4,162,634 | 7/1979 | Hofmann | 73/462 |
| 4,348,885 | 9/1982 | Mueller | 73/1 B |
| 4,489,605 | 12/1984 | Kops | 73/455 |
| 4,573,355 | 3/1986 | Reutlinger | 73/455 |
| 4,971,641 | 11/1990 | Nelson et al. | 156/64 |
| 4,986,149 | 1/1991 | Carmel et al. | 82/1.11 |
| 4,991,437 | 2/1991 | Hanchett | 73/455 |
| 5,273,398 | 12/1993 | Reinfelder et al. | 416/144 |

*Primary Examiner*—Ellis B. Ramirez
*Assistant Examiner*—Patrick J. Assouad
*Attorney, Agent, or Firm*—William W. Jones

[57] ABSTRACT

The rotor blades of a helicopter are balanced both in the chordal direction and in the spanwise direction in a static balancing assembly. The assembly includes a support surface on which there are four weighing scales. The scales are positioned in close proximity with the four corners of the rotor blade. The scales provide four cooperating pairs of blade spanwise and chordwise balancing reference data. The scales are operably connected to a microprocessor which is preprogrammed with desired balance data for the blades being tested. Deviations from the desired balance data detected by the scales and the microprocessor are corrected by selectively adding or subtracting weight on the blades at appropriate locations of the surfaces thereof.

15 Claims, 2 Drawing Sheets

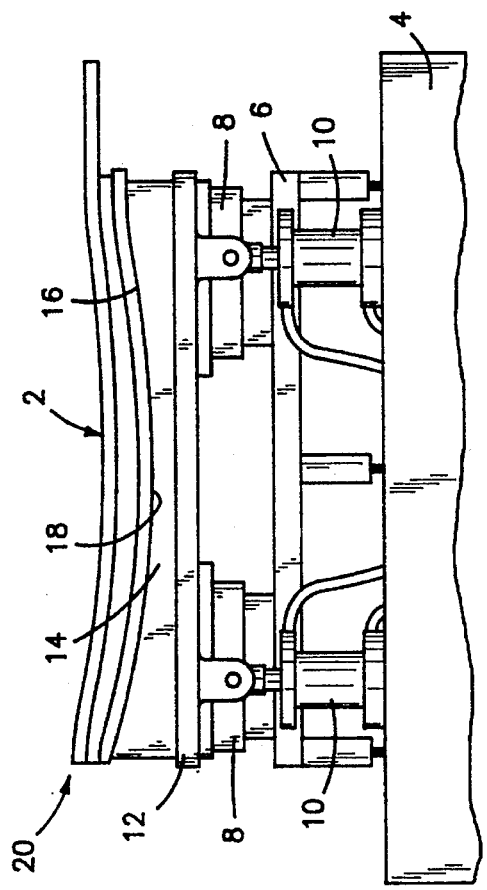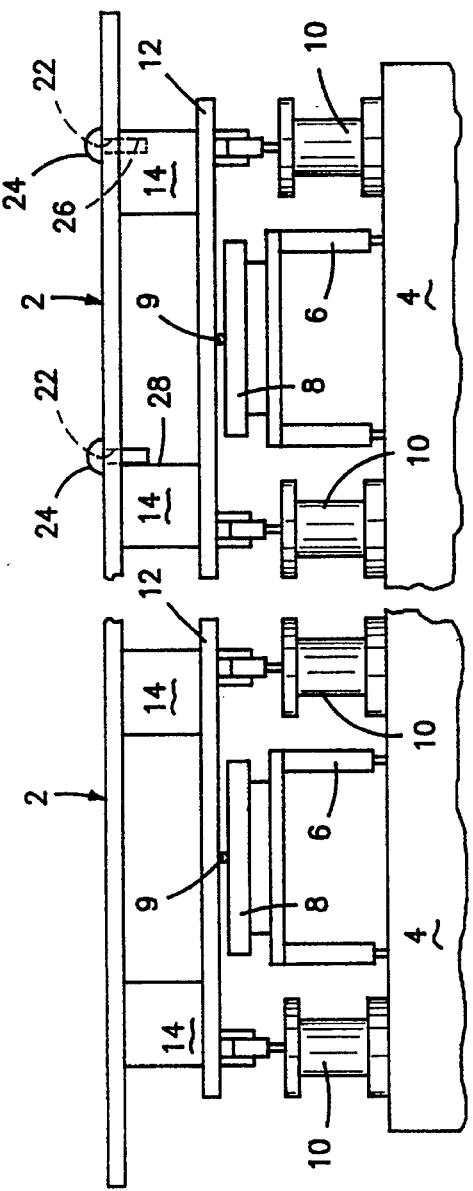

METHOD AND APPARATUS FOR BALANCING HELICOPTER ROTOR BLADES

TECHNICAL FIELD

This invention relates to a method and apparatus for balancing helicopter rotor blades for proper functioning on the helicopter.

BACKGROUND ART

Helicopter rotor blades, in order to operate properly in the dynamic environment in which they are used, must be properly balanced so that they will not cause a high vibration level in the helicopter. The rotor blades are typically manufactured with a multi-component assemblage which includes a spar, a leading edge sheath, trailing edge pocket fairing, whose weight or mass can vary from blade to blade in what are intended to be identically balanced blades. The blade assemblage is typically manufactured by bonding the aforementioned components using layers of film adhesive. The use of such multiple components to form the rotor blades results in weight distribution variations from blade to blade. In order for the rotor blades to perform properly, the weight distribution and the resultant moments of the blade must meet predetermined criteria which define target weight distribution and moments along the length or span of the blade from root to tip, and also chordally or edgewise of the blade, from the leading edge to the trailing edge thereof. The desired moments can be defined as blade length weight ratios between the root end of the blade and the tip end of the blade at both the leading and trailing edges; and as blade chordal weight ratios at both the root end and the tip end of the blade. Achieving such predetermined weight distribution criteria will result in a "balanced" rotor blade that will operate properly in its intended environment. Thus, each rotor blade must be individually checked for weight distribution, and must be brought into "balance"; or stated another way, must be made to conform to the desired ideal weight distribution which will produce optimum root-to-tip blade moment, and leading edge-to-trailing edge blade moment, and thus proper operation of the rotor blades.

The aforesaid procedure is time-consuming as it requires two different balancing stations. It would be desirable to be able to balance the blade both spanwise and chordwise at a single balancing station using a single balancing procedure with the same equipment being used to determine both spanwise and chordwise moments in the blade.

DISCLOSURE OF THE INVENTION

This invention relates to a method and apparatus for statically balancing helicopter rotor blades to provide proper operating moments in both the spanwise and chordwise directions, so as to substantially reduce or eliminate the need to dynamically balance the blades after an initial static balancing operation. In order to perform the method of this invention, properly contoured bladesupports are provided and the blade is placed on the supports. The supports are in turn lowered onto four scales which are positioned on a platform with the scales being accurately located close to the four corners of the rotor blade. The scales are preferably Toledo Model 1985 scales or equivalent high accuracy scales. The scales form four pairs of blade-weight datagathering points from which the need to alter the weight distribution of the rotor blade can be ascertained. The rotor blade has four moment-defining points which are: the leading edge/tip corner; the trailing edge/tip corner; the leading edge/root corner; and the trailing edge/root corner. If the blade weight ratios both lengthwise and chordwise at the aforesaid corners can be determined, the blade can be modified so as to provide the desired lengthwise and chordwise operating moments.

The four scales are operably connected to a Toledo 8146 desk mount display indicator, or similar, and to a microprocessor which is preprogrammed to analyze the gathered weight data, calculate the actual moments of the blade, and identify the amount of and locations on the blade where additional weight must be added to or taken off of the blade to achieve proper balance. The additional weight added is preferably in the form of adhesive films, however, other forms of weights can be used. The information that is preprogrammed into the microprocessor is essentially the weight ratios that are desired between the several paired weight data gathering points, plus an algorithm which can be used to modify the blade to achieve the desired weight ratios when given the actual weight ratios. It will be understood that the four corner weight ratios will confirm the four operating moments on the blade, both actual and desired. Once the actual leading edge and trailing edge spanwise moment values are determined, and the root, or "inboard", and tip, or "outboard" actual chordwise moment values are determined, these actual moment values are compared to the desired operating moment values, and the necessary weight distribution adjustments are determined to achieve the desired operating moments, and thus balance the blade. The necessary weight adjustments are made while the blade remains on the scales until the desired balancing is confirmed. The contribution of the weight of the contoured supports to the measured moments is a known factor which is nulled out in the microprocessor operating software. Tests have demonstrated that helicopter rotor blades that are statically balanced in the aforesaid fashion do not require further dynamic balancing.

It is therefore an object of this invention to provide a method and assembly for statically balancing helicopter rotor blades both chordwise and spanwise at a single balancing station.

It is a further object of this invention to provide a method and assembly of the character described wherein the leading edge and the trailing edge of the rotor blade are both provided with their respective desired operating moments in the spanwise direction.

It is an additional object of this invention to provide a method and assembly of the character described wherein both the inboard and the outboard edges of the rotor blades are provided with their respective desired operating moments in the chordwise direction.

These and other objects and advantages of the invention will become more readily apparent from the following detailed description of an embodiment thereof when taken in conjunction with the accompanying drawings, in which:

BRIEF DESCRIPTION OF THE DRAWINGS

FIG. 1 is an end elevational view of an embodiment of the apparatus used for performing the invention as viewed chordwise of the rotor blade;

FIG. 2 is a fragmented side elevational view of the apparatus of FIG. 1 as viewed spanwise of the rotor blade;

BEST MODE FOR CARRYING OUT THE INVENTION

Figure 3:
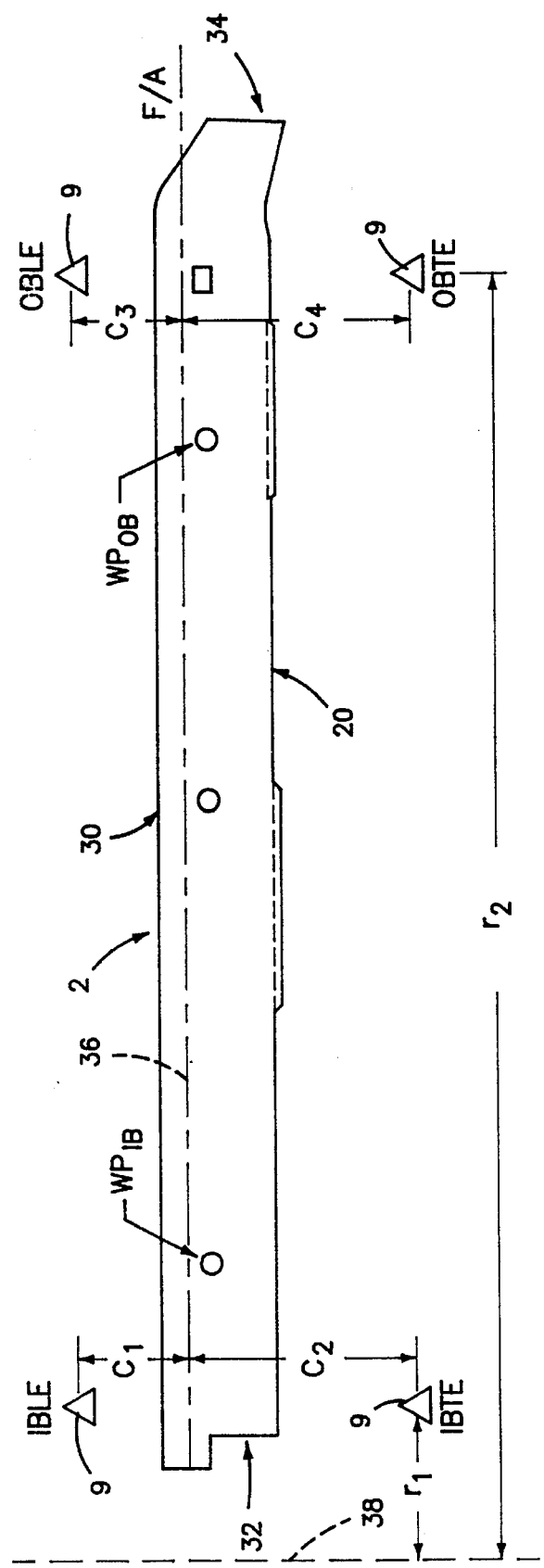
FIG. 3 is a schematic plan view of the blade showing the locations of the scales, and the reference parameters used to calculate the actual blade moment values, and calculate alterations of the blade weight distribution needed to arrive at the desired operating moment values.

Referring now to the drawings, there is shown in FIGS. 1 and 2 fragmented chordwise and spanwise edge views, respectfully, of the assemblage which operates in accordance with this invention to balance helicopter rotor blades, a blade being denoted generally by the numeral 2. The assemblage includes a support bench 4 on which a plurality of tables 6 are disposed. Each of the tables 6 supports a pair of separate point scales 8 which are operably connected with and feed data signals to a microprocessor which is not shown in FIGS. 1 and 2. A plurality of pneumatic jacks 10 are also disposed on the bench 4 and are operably connected to plates 12 which are situated above and overlie the scales 8. The plates 12 may then be selectively lowered onto the scales 8 by the jacks 10, or lifted off of the scales 8 by the jacks 10. The scales 8 are each provided with a plate-contact element 9 (shown in FIG. 2) which may take the form of a sphere, hemisphere, or the like, which provides point contact between the plates 12 and the scales 8.

The assemblage also includes a plurality of rotor blade support members 14. The support members 14 are formed from a reinforced and stiffened fiberglass composite and each has a precisely contoured upper surface 16 which conforms to the contour of the portions of the surface 18 on the blade 2 that the respective members 14 engage. The support members 14 are operable to provide strength and rigidity while prohibiting blade flexure, while at the same time minimizing the assemblage weight contribution of the members 14 so as to obtain accurate blade moment readings. The trailing edge 20 of the blade 2 can be provided with locating holes 22 which receive locating pins 24 that are operable to engage the support members 14, either in a matching opening 26 in a support member 14, or by engaging a side surface 28 of a support member 14, as shown in FIG. 2. The locating pins 24 are thus operative to properly position the blade 2 on the assemblage, and which pins 24 may be operable to fasten the blade 2 to the support members 14. This will result in achievement of the desired positioning of the corners of the blade 2 relative to the scales 8. This also serves to pin the blade skin to the remainder of the blade 2 during the balancing process.

Rotor blade chordwise moment readings are obtained by recording the weight displayed on each of the four scales 8, taking into account the distance of the weight-bearing point on each of the scales from the feathering axis of the blade 2, as will be described in greater detail hereinafter.

Referring now to FIG. 3, a schematic plan view of the rotor blade 2 is shown, along with the various reference points and dimensions which are used to calculate the spanwise and chordwise moments of the blade 2. The rotor blade 2 has a leading edge 30 and a trailing edge 20. The root or inboard end of the blade 2 is designated by the numeral 32 and the tip or outboard end of the blade 2 is designated by the numeral 34. The feathering axis of the blade 2 is designated by the numeral 36. The scale points of support for the blade 2 are designated by the numeral 9, and the axis of rotation of the rotor is denoted by the reference line 38 which is perpendicular to the feathering axis 36. It will be noted that one scale point 9 which is designated OBTE (outboard trailing edge) is located a distance $C_4$ to the trailing edge side of the feathering axis 36, and a distance $r_2$ outboard of the reference line 38. Another scale point 9 which is designated OBLE (outboard leading edge) is located a distance $C_3$ to the leading edge side of the feathering axis 36, and the distance $r_2$ outboard of the reference line 38. The third scale point 9 which is designated IBTE (inboard trailing edge) is located a distance $C_2$ to the trailing edge side of the feathering axis 36 and a distance $r_1$ outboard of the reference line 38. The fourth and final scale point 9 is designated IBLE (inboard leading edge) is located a distance $C_1$ to the leading edge side of the feathering axis 36, and the distance $r_1$ from the reference line 38.

From the above, it will be appreciated that there are a pair of leading edge scale points (IBLE and OBLE); a pair of trailing edge scale points (IBTE and OBTE); a pair of inboard scale points (IBLE and IBTE); and a pair of outboard scale points (OBLE and OBTE). Weight readings at these pairs of scale points are used to determine the rotor blade's actual inboard (IBM) and outboard (OBM) chordwise moments as follows:

$$IBM_{chordwise}=(IBLE)(C_1)-(IBTE)(C_2); \text{ and}$$

$$OBM_{chordwise}=(OBLE)(C_3)-(OBTE)(C_4).$$

The symbols $WP_{IB}$ and $WP_{OB}$ shown in FIG. 3 are used to schematically designate the general locations of weight distribution-altering elements which will be used to modify the actual chordwise moments to bring them into conformity with the target chordwise moments which are needed to properly balance the blade 2. Once the actual chordwise moments are known, the identity of $WP_{IB}$ and $WP_{OB}$ are determined by solving the following equations:

$$IBM_{chordwise} \pm WP_{IB}=MC_{IB}; \text{ and}$$

$$OBM_{chordwise} \pm WP_{OB}=MC_{OB}; \text{ wherein}$$

$MC_{IB}$ is the target chordwise inboard moment; and $MC_{OB}$ is the target chordwise outboard moment.

Once $WP_{IB}$ and $WP_{OB}$ are known, the necessary chordwise weight adjustments are made on the blade. These chordwise weight adjustments can be made in several different ways. When the necessary weight adjustments are relatively minor, they can be made by adding an appropriate number of adhesive film sheets to one or both of the weight adjustment locations, $WP_{IB}$ and/or $WP_{OB}$, on the blade as necessary. The system microprocessor will determine the necessary weight which must be added or subtracted and where it should be added or subtracted on the rotor blade. Alternatively, when the weight distribution adjustments are relatively large, the use of weighted inserts placed inside of the blade 2 may be used to properly balance the blade.

Once the proper chordwise moments are achieved, the spanwise moment is adjusted to the target spanwise moment by adding or removing weight from inboard and outboard areas on the blade along its feathering axis while the blade remains on the scales.

Figure 4:
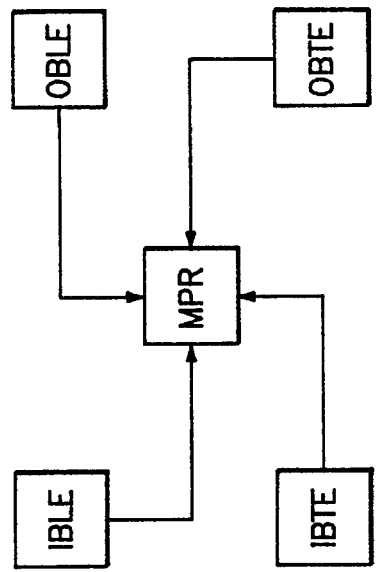
FIG. 4 is a schematic system diagram of the various components in the apparatus of FIG. 1.

Referring now to FIG. 4, a schematic view of the rotor blade balancing apparatus showing the four point scales, and the microprocessor (MPR) tied into the scales. It will be understood that the MPR is fed weight information from the point scales. After the weight changes have been made to the rotor blade 2 on the balancing apparatus, the scales are used to confirm that the blade has been properly balanced. When the desired rotor balancing moments are achieved, the blade 2 will be removed from the balancing status and a new blade will be mounted thereon, and balanced, in the same manner as described above.

It will be readily appreciated that the balancing assembly of the invention can accurately balance a helicopter rotor blade in both the chordwise and spanwise directions on a static platform balancing station so that dynamic whirl balancing of the blades may be eliminated.

Since many changes and variations of the disclosed embodiment of this invention may be made without departing from the inventive concept, it is not intended to limit the invention otherwise that as required by the appended claims.

What is claimed is:

1. An assembly for statically determining actual chordwise inboard and actual chordwise outboard moments of a helicopter rotor blade, said assembly comprising:
   a) a first weighing scale positioned proximate to an inboard leading edge corner of the rotor blade;
   b) a second weighing scale positioned proximate to an inboard trailing edge corner of the rotor blade;
   c) a third weighing scale positioned proximate to an outboard leading edge corner of the rotor blade;
   d) a fourth weighing scale positioned proximate to an outboard trailing edge corner of the rotor blade;
   e) said first and second weighing scales forming an inboard chordwise means for providing inboard weight values for determining an actual chordwise inboard moment of the rotor blade;
   f) said third and forth weighing scales forming an outboard chordwise means for providing outboard weight values for determining an actual chordwise outboard moment of the rotor blade; and
   g) microprocessor means connected to said inboard and outboard chordwise means and operate to utilize said inboard and outboard weight values to determine said actual inboard and outboard chordwise rotor blade moments.

2. The assembly of claim 1 wherein said first weighing scale is offset a distance $C_1$ to the leading edge side of a feathering axis of the rotor blade; said second weighing scale is offset a distance $C_2$ to the trailing edge side of the feathering axis of the rotor blade; said third weighing scale is offset a distance $C_3$ to the leading edge side of the feathering axis of the rotor blade; and said fourth weighing scale is offset a distance $C_4$ to the trailing edge side of the feathering axis of the rotor blade; and wherein said microprocessor means is programmed to determine the actual inboard and outboard chordwise moments by solving the equations:

$$CWMIB=(IBLE) \times C_1 - (IBTE) \times C_2; \text{ and}$$

$$CWMOB=(OBLE) \times C_3 - (OBTE) \times C_4; \text{ wherein}$$

CWMIB is the actual chordwise inboard moment of the rotor blade;

IBLE is the weight registered by said first weighing scale;

IBTE is the weight registered by said second weighing scale;

CWMOB is the actual chordwise outboard moment of the rotor blade;

OBLE is the weight registered by said third weighing scale; and

OBTE is the weight registered by said fourth weighing scale.

3. The assembly of claim 2 wherein said microprocessor means is programmed to calculate rotor blade inboard and outboard weight corrections which are needed to arrive at a target inboard chordwise moment and at a target outboard chordwise moment for the rotor blade, which target moments are designed to achieve target chordwise aerodynamic balance for the rotor blade.

4. The assembly of claim 3 wherein said microprocessor means is programmed to calculate said inboard and outboard weight corrections by solving the equations:

$$WP_{IB}=(IBLE) \times C_1 - (IBTE) \times C_2 \pm MC_{IB}; \text{ and}$$

$$WP_{OB}=(OBLE) \times C_3 - (OBTE) \times C_4 \pm MC_{OB}; \text{ wherein}$$

$MC_{IB}$ is the target inboard chordwise moment;

$WP_{IB}$ is the inboard weight correction needed to achieve $MC_{IB}$;

$MC_{OB}$ is the target outboard chordwise moment; and $WP_{OB}$ is the outboard weight correction needed to achieve $MC_{OB}$.

5. The assembly of claim 4 wherein said first and third weighing scales form a leading edge means for providing leading edge weight values for determining an actual leading edge spanwise moment of the rotor blade; said second and fourth weighing scales forming a trailing edge means for providing trailing edge weight values for determining an actual trailing edge spanwise moment of the rotor blade; said microprocessor means being connected to said leading edge and trailing edge means and operable to utilize said leading edge and trailing edge weight values to determine said actual leading edge and trailing edge spanwise rotor blade moments.

6. The assembly of claim 5 wherein said first and second weighing scales are spaced apart from an imaginary line which is perpendicular to said rotor blade feathering axis and intersects an operational axis of rotation of the blade by a distance $r_1$ and said third and fourth weighing scales are spaced apart from said imaginary line by a distance $r_2$, and wherein said microprocessor means determines said actual leading edge and trailing edge spanwise rotor blade moments by solving the equation:

$$SWM=(IBLE+IBTE \pm WP_{IB}) \times r_1 + (OBLE+OBTE \pm WP_{OB}) \times r_2;$$

wherein
SWM is the actual spanwise moment of the rotor blade.

7. The assembly of claim 6 wherein said microprocessor means is programmed to calculate rotor blade inboard and outboard spanwise weight corrections which are needed to arrive at a target spanwise moment for the rotor blade, which target spanwise moment is designed to achieve target spanwise aerodynamic balance for the rotor blade.

8. The assembly of claim 7 wherein said microprocessor means is programmed to calculate said spanwise weight corrections by solving the equation:

$$SWM_{REQD}=SWM \pm W_{F/A} \times r_s$$

where:

$SWM_{REQD}$ is the required final spanwise moment of the blade $W_{F/A}$ is weight to be added or removed at feathering axis (F/A)

$r_s$ is the spanwise distance of $W_{F/A}$ from axis of rotation.

9. The assembly of claim 1 further comprising inboard support means for the rotor blade for supporting an inboard portion of the rotor blade on said first and second weighing scales; and outboard support means for the rotor blade for supporting an outboard portion of the rotor blade on said third and fourth weighing scales, said support means each having rotor blade-supporting surfaces which are configured so as to closely conform to the respective supported surfaces of the rotor blade.

10. The assembly of claim 9 wherein each of said weighing scales is disposed in single point contact with a respective one of said inboard and outboard support means.

11. The assembly of claim 9 further comprising means for temporarily fastening said rotor blade to at least one of said support means.

12. The assembly of claim 9 further comprising lifting means for holding said support means, said lifting means being operable to selectively elevate said support means above said weighing scales.

13. A method for statically adjusting the weight distribution of a helicopter rotor blade so as to provide operational spanwise and chordwise balancing of the rotor blade, said method comprising the steps of:

a) determining actual inboard and outboard chordwise moments for the rotor blade;

b) adding or subtracting inboard and/or outboard weight chordwise on the rotor blade so as to conform the actual chordwise blade moments to target inboard and outboard chordwise blade moments;

c) determining actual leading edge and trailing edge spanwise blade moments which result from the conformed target chordwise blade moments; and d) adding or subtracting inboard and/or outboard weight spanwise on the rotor blade so as to conform the actual spanwise blade moments to target leading and trailing edge spanwise moments.

14. An assembly for statically determining actual chordwise inboard and actual chordwise outboard moments of a helicopter rotor blade component, said assembly comprising:

a) a first weighing scale positioned proximate to an inboard leading edge corner of the component;

b) a second weighing scale positioned proximate to an inboard trailing edge corner of the component;

c) a third weighing scale positioned proximate to an outboard leading edge corner of the component;

d) a fourth weighing scale positioned proximate to an outboard trailing edge corner of the component;

e) said first and second weighing scales forming an inboard chordwise means for providing inboard weight values for determining an actual chordwise inboard moment of the component;

f) said third and fourth weighing scales forming an outboard chordwise means for providing outboard weight values for determining an actual chordwise outboard moment of the component; and g) microprocessor means connected to said inboard and outboard chordwise means and operate to utilize said inboard and outboard weight values to determine said actual inboard and outboard chordwise component moments.

15. A method for statically adjusting the weight distribution of a helicopter rotor blade component so as to provide operational spanwise and chordwise balancing of the component, said method comprising the steps of:

a) determining actual inboard and outboard chordwise moments for the component;

b) adding or subtracting inboard and/or outboard weight chordwise on the component so as to conform the actual chordwise component moments to target inboard and outboard chordwise component moments;

c) determining actual leading edge and trailing edge spanwise component moments which result from the conformed target chordwise component moments; and d) adding or subtracting inboard and/or outboard weight spanwise on the component so as to conform the actual spanwise component moments to target leading and trailing edge spanwise moments.

* * * * *